United States Patent [19]

Noll

[11] 4,323,223
[45] Apr. 6, 1982

[54] APPARATUS FOR FORMING A CLOSED CUT SURFACE IN A WALL OF A WORKPIECE

[75] Inventor: Hans Noll, Leverkusen, Fed. Rep. of Germany

[73] Assignee: Maschinen- und Armaturen- J & W Müller, fabrik GmbH, Leverkusen, Fed. Rep. of Germany

[21] Appl. No.: 246,450

[22] Filed: Mar. 23, 1981

[30] Foreign Application Priority Data

Mar. 24, 1980 [DE] Fed. Rep. of Germany ....... 3011256

[51] Int. Cl.³ .......................... B23K 7/04; B23K 7/10
[52] U.S. Cl. ........................................ 266/54; 266/57; 266/72
[58] Field of Search ...................... 266/54, 57, 69, 70, 266/72; 148/9 R

[56] References Cited

U.S. PATENT DOCUMENTS

| | | | |
|---|---|---|---|
| 2,437,025 | 3/1948 | Hatten | 266/54 |
| 4,222,795 | 9/1980 | Hoaglin et al. | 266/57 |
| 4,265,430 | 5/1981 | Eriksson et al. | 266/54 |

Primary Examiner—W. Stallard
Attorney, Agent, or Firm—Kenyon & Kenyon

[57] ABSTRACT

The cutting apparatus is used to cut a hole in a workpiece such as a pipe of relatively large thickness. The burner is mounted on a carriage which is reciprocated along a radially directed carrier which rotates about an axis perpendicular to the carrier. Reciprocation of the carriage is controlled as a function of the rotation of the carrier about the axis. In addition, a cam causes pivoting of the burner in accordance with the reciprocation of the carriage along the carrier. Operation of the apparatus is such that the tip of the burner is held at a constant distance from the surface of the workpiece. A motor is also provided for moving the burner longitudinally of its axis.

12 Claims, 3 Drawing Figures

APPARATUS FOR FORMING A CLOSED CUT SURFACE IN A WALL OF A WORKPIECE

This invention relates to an apparatus for forming a closed cut surface in a wall of a workpiece.

Heretofore, various types of cutting devices have been known for cutting a hole in the wall of a workpiece, for example, in order to permit a pipe to be inserted therein on an angle. In one case, it has been known to use a device for cutting a hole corresponding to an entering pipe which rotates back and forth about an axis during cutting so that a cutting torch is moved in a direction parallel to the axis of the larger pipe in accordance with a predetermined program while the axis of the torch is tilted during this motion. However, these devices are suited only for cases where the diameter of the pipe does not exceed a certain size.

Other cutting devices are also known in which a hole corresponding to the intersection curve of a main pipe with a pipe entering at an angle is cut in the main pipe, while held stationary, by a burner which revolves about an axis of the surface of the cut and in which the axis of the burner can be tilted. However, these devices, as well as the above noted devices, require control of the movements of the burner by skilled specialists. Further, these devices may cause considerable error upon the slightest inattention by the operators.

Accordingly, it is an object of the invention to provide an apparatus for generating a desired cutting surface in a workpiece wall automatically.

It is another object of the invention to provide a relatively simple automatic apparatus for cutting a hole in a pipe of relatively thick wall thickness to accurately receive a smaller pipe at an inclined angle.

It is another object of the invention to provide an apparatus which can be simply programmed to form a closed cut surface on a constant angle in a workpiece.

Briefly, the invention provides an apparatus for cutting a hole in a wall of a workpiece which comprises a carrier mounted for rotation about an axis of rotation perpendicular to the carrier, a burner which is adjustably mounted on the carrier and means for moving the burner along the carrier radially of the axis of rotation. In addition, a computer is connected to the means for moving the burner in order to control this means as a function of the rotation of the burner about the axis of rotation of the carrier. Also, a means is provided for tilting the burner in a predetermined program in a plane coincident with the carrier and the axis of rotation as a function of the radial movement of the burner relative to the carrier such that a tip of the burner is held at a constant distance from the surface of the workpiece.

The means for tilting the burner consists preferably of a cam which is mounted for rotation about a pivot axis perpendicular to the carrier and which is movable with the burner relative to the carrier. In addition, the cam has a cam surface which is adapted to ride on a stop so as to control the tilting of the burner.

The apparatus is particularly intended for cutting a hole in the wall of a pipe into which a pipe of smaller diameter is to enter at an angle along the line of intersection of the pipes. In particular, the apparatus is useful where the wall thickness of the pipes is so large that the surface of the cut has an angle relative to the radius of the pipe which changes along the line of intersection. However, the apparatus may also be used to form, for example, an appropriate cut surface in a thick plate into which a pipe may enter at an angle.

These and other objects and advantages of the invention will become more apparent from the following detailed description taken in conjunction with the accompanying drawings in which.

Figure 1:
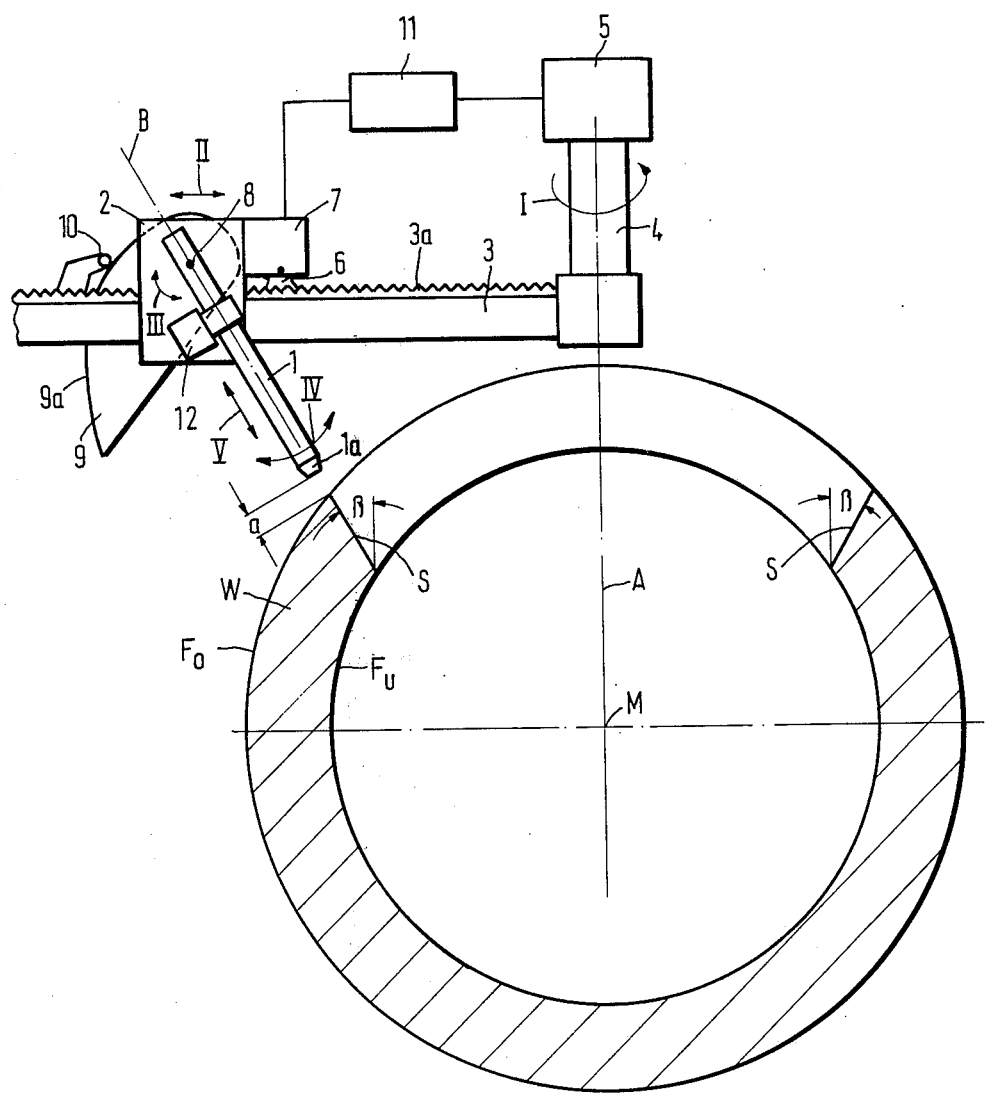
FIG. 1 illustrates a cross-sectional view through a part of a pipe into which a hole is to be cut by an apparatus according to the invention.
Figure 2:
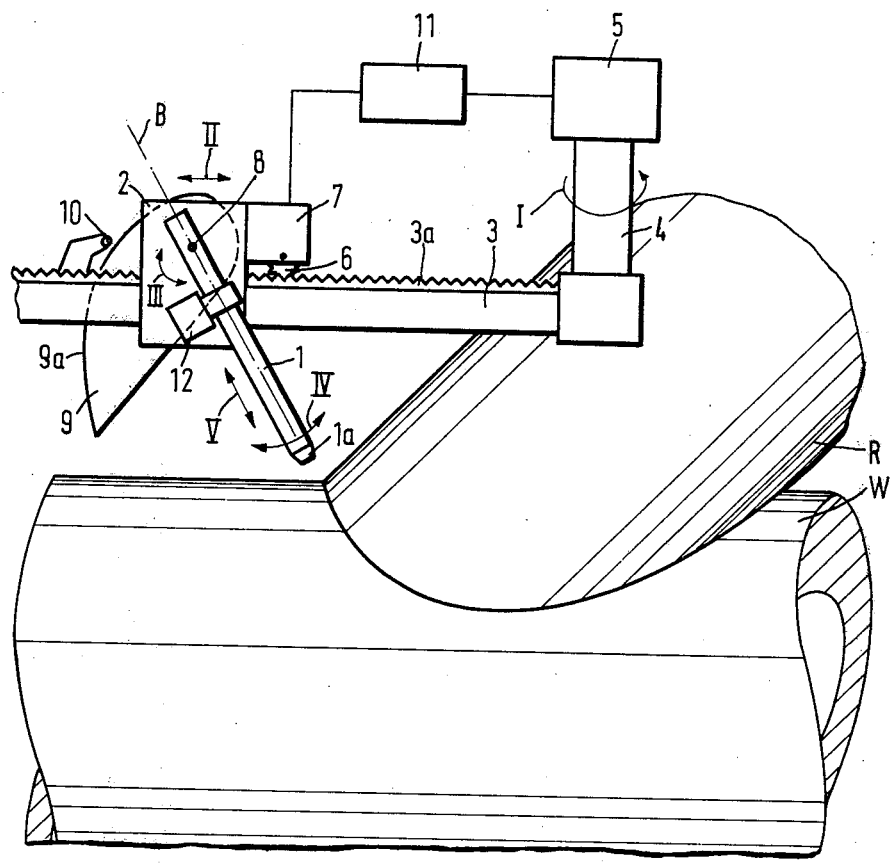
FIG. 2 illustrates a view of the apparatus of FIG. 1 from the side of a pipe.

Referring to FIG. 1, the cutting apparatus is, as viewed, mounted above a workpiece, such as a pipe W in order to cut a hole in the wall of the pipe W for entry of a pipe R (see FIG. 2) of smaller diameter. The apparatus includes a burner 1 which is mounted on a carriage 2 which, in turn, is movably mounted on a carrier 3. The carrier 3 is secured in a radial manner to a shaft 4 which is rotatable via a motor 5 to rotate about an axis A passing through the center M of the pipe W.

A means is also provided for moving the burner 1 along the carrier 3 radially of the axis A. As indicated, this means includes a rack 3a which is supported on the carrier 3 and a pinion 6 which meshes with the rack 3a and which is driven by a motor 7 mounted on the carriage 2. A suitable means such as a computer 11 is connected to the motor 7 for controlling the motor 7 and thus the movement of the carriage 2 as a function of the rotation of the burner 1, carrier 2 and shaft 4 about the axis A.

The burner 1 is pivotally mounted on the carriage 2 about a pivot axis formed by a shaft 8 which is disposed perpendicular to the plane of the carrier 3. In addition, a means is provided for tilting the burner 1 in a predetermined program about the pivot axis of the shaft 8 as a function of the movement of the burner 1 and carriage 2 along the carrier 3. As indicated, the burner 1 is tilted in a plane substantially coincident with the carrier 3 and axis of rotation A as a function of the radial movement of the burner 1 relative to the carrier 3. This tilting means includes a cam 9 which is mounted on the carriage 2 on the pivot axis of the shaft 8 for pivoting with the burner 1 as well as a stop 10 which is fixedly mounted on the carrier 3. The cam 9 is provided with a cam surface 9a which is biased continuously against the stop 10. As indicated, the distance of the stop 10 from the carrier 3 is the same as the distance of the pivot axis of the shaft 8 from the carrier 3.

During operation, the shaft 4 rotates in the direction indicated by the arrow I. At this time, the carrier 3 rotates about the axis of rotation A while the carriage 2 is moved along the carrier 3 in the direction indicated by the arrow II via the motor 7. The movement of the carrier 2 occurs as a function of the rotation of the burner 1, carrier 3 and shaft 4 about the axis A. Further, during movement of the carriage 2, the cam 9 which is continuously biased against the stop 10 is pivoted about the pivot axis of the shaft 8 in the direction indicated by the arrow III. This, in turn, causes the burner 1 to be pivoted in the direction indicated by the arrow IV. The cam surface 9a of the cam 9 is shaped so that the direction of the longitudinal axis B of the burner 1 maintains a constant angle $\beta$ with the axis of rotation A and so that the tip 1a of the burner 1 is held at a constant distance from the outer surface $F_o$ of the pipe W. In this manner, the desired cutting line S is formed.

Referring to FIG. 1, the apparatus may also include means for moving the burner 1 longitudinally of its axis B. For example, this means includes a motor 12 which is mounted on the carriage 2 and which is suitably connected to the burner 1 to cause reciprocation of the burner 1 along the axis B. Further, the motor 12 can be operated so that the burner tip 1a is maintained at the distance a from the outer surface $F_o$ of the pipe W during one part of the rotation of the apparatus about the axis of rotation A while being maintained at the same distance a from the inner surface $F_u$ of the pipe W during another part of the rotation of the apparatus about the axis A; the burner 1 being moved in the region between these two parts of the rotation of the apparatus about the axis A when travelling from one part to the other. This motion is of particular importance when cutting off the pipe R (see FIG. 2) entering the pipe W.

Figure 3:
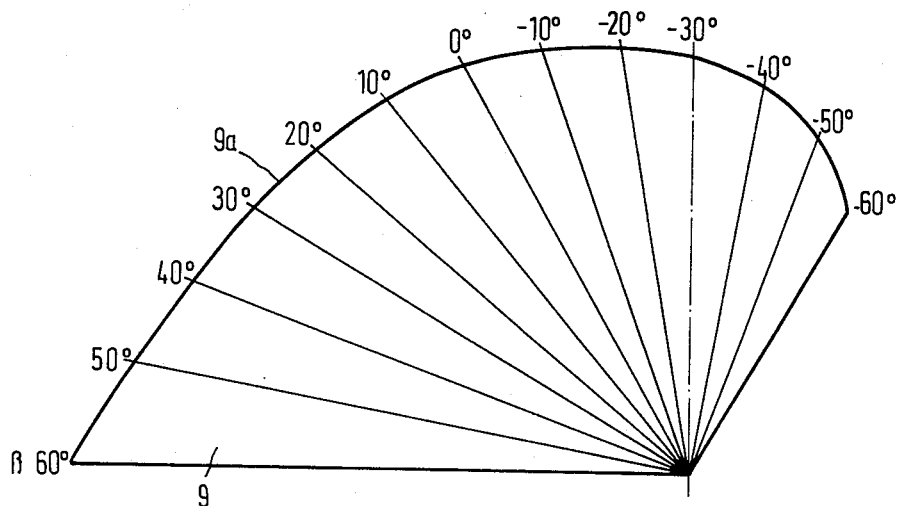
FIG. 3 illustrates a view of a cam used in the apparatus of FIG. 1.

Referring to FIG. 3, the curve of the cam surface 9a of the cam 9 corresponds to the equation $$E = \operatorname{Tan} \beta \cdot G$$

Wherein E is the distance of the curve from the center of rotation of the cam 9;

$\beta$ is the angle of rotation of the cam 9; and

G is the distance of the center of rotation of the axis M of the pipe W.

What is claimed is:

1. An apparatus for cutting a hole in a wall of a workpiece, said apparatus comprising a carrier mounted for rotation about an axis perpendicular to said carrier;

a burner adjustably mounted on said carrier and having a tip at one end;

first means for moving said burner along said carrier radially of said axis;

a computer connected to said means for controlling said means as a function of the rotation of said burner about said axis; and second means for tilting said burner in a predetermined program in a plane coincident with said carrier and said axis as a function of the radial movement of said burner relative to said carrier whereby said tip is held at a constant distance from a surface of the workpiece wall.

2. An apparatus as set forth in claim 1 which further comprises means for moving said burner longitudinally thereof.

3. An apparatus as set forth in claim 2 wherein said second means includes a cam mounted for rotation about a pivot axis and being movable with said burner relative to said carrier, said cam having a cam surface thereon, and a stop having said cam surface riding thereon.

4. An apparatus as set forth in claim 3 wherein said cam and said burner are pivotal about a common pivot axis.

5. An apparatus as set forth in claim 1 wherein said second means includes a cam mounted for rotation about a pivot axis and being movable with said burner relative to said carrier, said cam having a cam surface thereon, and a stop having said cam surface riding thereon.

6. An apparatus as set forth in claim 3 wherein said cam and said burner are pivotal about a common pivot axis.

7. An apparatus for forming a closed cut surface in a wall of a workpiece, said apparatus comprising a carrier mounted for rotation about a first axis perpendicular to said carrier;

a carriage movably mounted on said carrier;

a burner mounted on said carriage and having a tip at one end;

a motor for moving said carriage along said carrier radially of said axis;

means connected to said motor for controlling said motor as a function of the rotation of said burner and carrier about said axis; and second means for tilting said burner about a pivot axis perpendicular to the plane of said carrier as a function of the movement of said burner and carriage on said carrier whereby said burner maintains a constant angle relative to said first axis.

8. An apparatus as set forth in claim 7 wherein said second means includes a stop mounted on said carrier and a cam pivotally mounted on said carrier about said pivot axis for pivoting with said burner, said cam having a cam surface biased against said stop.

9. An apparatus as set forth in claim 7 which further comprises a motor for moving said burner longitudinally thereof relative to said carrier to adjust the distance of said burner tip relative to a surface of a workpiece.

10. An apparatus as set forth in claim 7 wherein the workpiece is a cylindrical pipe having a thick wall and said first axis is radially disposed to said pipe.

11. An apparatus as set forth in claim 8 wherein the workpiece is a pipe and said cam surface has a curvature corresponding to the equation $E = \operatorname{Tan} \beta \cdot G$ wherein E is the distance of the curve from the center of rotation of said cam, $\beta$ is the angle of rotation of said cam, and G is the distance of the center of rotation of said cam to the longitudinal axis of said pipe.

12. An apparatus as set forth in claim 4 wherein the workpiece is a pipe and said cam surface has a curvature corresponding to the equation $E = \operatorname{Tan} \beta \cdot G$ wherein E is the distance of the curve from the center of rotation of said cam, $\beta$ is the angle of rotation of said cam, and G is the distance of the center of rotation of said cam to the longitudinal axis of said pipe.

* * * * *